US009508185B2

(12) United States Patent
Nagy

(10) Patent No.: US 9,508,185 B2
(45) Date of Patent: Nov. 29, 2016

(54) TEXTURING IN GRAPHICS HARDWARE

(75) Inventor: Gabor Nagy, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 302 days.

(21) Appl. No.: 13/099,281

(22) Filed: May 2, 2011

(65) Prior Publication Data
US 2012/0280973 A1 Nov. 8, 2012

(51) Int. Cl.
*G06T 15/04* (2011.01)
*G06T 15/00* (2011.01)

(52) U.S. Cl.
CPC ........... *G06T 15/04* (2013.01); *G06T 15/005* (2013.01); *G06T 2200/28* (2013.01)

(58) Field of Classification Search
CPC ............. H04N 7/50; H04N 7/26244; H04N 7/26271; H04N 7/465; H03M 7/30
See application file for complete search history.

(56) References Cited

U.S. PATENT DOCUMENTS

| 6,304,268 | B1  |   | 10/2001 | Iourcha et al. |     |
|-----------|-----|---|---------|----------------|-----|
| 6,583,790 | B1  | * | 6/2003  | Wolters        | 345/584 |
| 7,372,467 | B1  | * | 5/2008  | Toksvig et al. | 345/582 |
| 7,477,266 | B1  | * | 1/2009  | Bastos et al.  | 345/634 |
| 7,586,496 | B1  | * | 9/2009  | Donovan et al. | 345/582 |
| 2006/0028482 | A1 |   | 2/2006  | Donovan et al. |     |
| 2006/0050072 | A1 | * | 3/2006  | Goel           | 345/423 |
| 2006/0164429 | A1 |   | 7/2006  | Mantor et al.  |     |
| 2007/0047651 | A1 | * | 3/2007  | Kim et al.     | 375/240.16 |
| 2008/0037865 | A1 |   | 2/2008  | Vetter et al.  |     |
| 2008/0143720 | A1 | * | 6/2008  | Elmquist       | 345/426 |
| 2009/0295819 | A1 |   | 12/2009 | Buchner et al. |     |
| 2009/0315909 | A1 |   | 12/2009 | DeLaurier et al. |   |

FOREIGN PATENT DOCUMENTS

| JP | 2002352267 | 12/2002 |
| JP | 2006235858 | 9/2006 |
| JP | 2009048509 | 3/2009 |

OTHER PUBLICATIONS

International Search Report and Written Opinion for International Application No. PCT/US2012/036001, mailed Nov. 28, 2012, 8 pages.
Blinn, J.F. et al., "Texture and Reflection in Computer Generated Images", Communications of the Association for Computing Machinery, ACM, Oct. 1, 1976, pp. 542-547, vol. 19, No. 10, New York, NY USA.
Konma, Toshihiro, "Rendering and Texture: Introduction to CG Creation in the Multimedia Age", Nikkei Bus. Pub., Inc. Nov. 1996, No. 122, pp. 237 (Bump Mapping).

(Continued)

*Primary Examiner* — Edward Martello
(74) *Attorney, Agent, or Firm* — Kilpatrick Townsend & Stockton LLP

(57) ABSTRACT

Methods, systems, and devices for rendering computer graphics using texture maps are disclosed. Multiple texture maps with disparate data types, such as a mix of integer data types for RGB colors and floating point data types for XYZ normal vector components, are passed as one texture map set to a graphics processing unit (GPU). Filter parameters and other interpolation parameters are re-used between the disparate texture maps. A user can specify a number of integer and floating point-based channels for processing at one time by the GPU, thereby customizing a texture set structure.

20 Claims, 11 Drawing Sheets

(56) References Cited

OTHER PUBLICATIONS

McCool et al., "Texture Shaders," Eurographics Los Angeles, 1999.
Heckbert, "Survey of Texture Mapping," IEEE Computer Graphics and Applications, Nov. 1986, vol. 6(11), pp. 56-67.
Supplementary European Search Report, May 15, 2015, EP application No. 12779921, 6 pages.
Wang et al., "Non-Photorelaistic Rendering Based on Graphics Hardware Acceleration," Journal of Engineering Graphics, 2005, issue No. 4, pp. 60-66 (English Abstract).
Japanese Application No. JP2014-509363 , "Office Action", issued Jun. 7, 2016, 7 pages.
Dickheiser, Game Programming Gems 6 Japanese edition, Borndigital, Aug. 1, 2007, First Edition, pp. 453-463 English language translation.

* cited by examiner

TEXTURING IN GRAPHICS HARDWARE

CROSS-REFERENCES TO RELATED APPLICATIONS

NOT APPLICABLE

BACKGROUND

1. Field of the Invention

Embodiments of the present invention relate to computer graphics processing systems in general and, in particular, to graphics processing units (GPUs) that accept and process multiple, different types of texture maps as a related single set for three-dimensional scenes.

2. Description of the Related Art

Three-dimensional (3D or 3-D) models in modern video games use multiple textures to approach a realistic appearance in 3D scenes. A texture, sometimes called a texture map, is typically a table of color, transparency, material properties, surface orientations, or other features that can be digitally wrapped around or otherwise mapped to a 3D object. In video games, the textures used for a 3D model often include a diffuse color texture, a specular (shiny) color texture, a normal map, a transparency map, material index, and others. These textures are applied one at a time to a 3D model by storing the appropriate texture in memory and passing an address to the memory to a graphics processor unit (GPU).

FIG. 1 illustrates a prior art system for applying textures to an image with a graphics processor. In system 100, three-dimensional model 101 is stored in a memory for processing by GPU 113. Texture map 105, consisting of red (R) channel map 102, green (G) channel map 103, and blue (B) channel map 104, are stored in a memory for application onto the model.

Each of the channel maps is a generic N-dimensional table that happens to have hardware support for interpolation and filtering. The channel maps can be integer- or floating point-based depending upon the application. For example, diffuse texture map 105 is integer-based, all data within being of integer data type 109. The diffuse map has three integer values per texel, R, G, and B, representing the red, green, and blue color components. The three integer values for each texel follow one another in memory, i.e., are interleaved. That is, values in the table are stored as RGB, RGB, RGB, etc. Each 8-bit integer represents an amount of red color and is allowed values between and including 0 to 255. Taken with the G and B channels, the amount of colors represented by RGB texture map 105 is 256×256× 256~=over 16 millions colors. In alternative formats, an additional alpha A (transparency) channel is sometimes interleaved with the RGB values for the texel in an "RGBA" format. That is, values in the table are stored as RGBA, RGBA, RGBA, etc. This allows for a 4-byte memory alignment of texels for 8-bit channel textures. If the alpha channel is unused in the alternate format, it is sometimes wasted and called an "RGBX" format. In the exemplary embodiment, a memory address of texture map 105 is sent as a parameter in a function to the GPU for mapping to the 3D object.

After the colors of diffuse color texture map 105 are applied to 3D model 101, control is turned back from GPU 113 to the rendering application (i.e., the "user" of the GPU). The rendering application then passes specular (i.e., shiny) color RGB texture map 106 to GPU 113 with (an address of) an image storing the results of the first step. Like diffuse color texture map 105, Specular color texture map 106 is also an integer-based texture map consisting of three channels: RGB. The specular colors are applied to the 3D model to update the image.

After the diffuse and specular color textures are applied to the 3D model, a normal map can be used to update the image. A surface in which a light source is directly normal (i.e., orthogonal) to a surface is lit differently than one in which the light source is at an angle. Similarly, light sources at grazing angles off a surface with respect to the location of the virtual camera are lit differently.

Normal map 107 is passed as a parameter to GPU 113. Normal map 107 is floating point-based, represented by floating point data type 110 for all data in its tables. Each floating-point number in its X, Y, and Z tables represents a direction in space. The X channel map is a two-dimensional array of floating point numbers. Each 32-bit signed floating point number represents a magnitude in the X-direction that a unit vector leans, i.e., the X component of the unit vector. Y and Z channels represent Y and Z components of the unit vector, respectively. A memory address of each array is sent as a parameter to the GPU for processing to update the image.

After lighting is updated using the normal map, transparency/opacity is applied. Transparency map 108, an integer-based texture map, is represented in a single channel, sometimes called the "alpha channel." The alpha channel is a single, two-dimensional array of integers. The greater the integer, the more opaque. The values typically represent 'one-minus' the transparency.

After the four texture maps are applied to the 3D model, a relatively realistic-looking image is ready for presentation to an end user in a video game, computer aided design (CAD) image, or other three-dimensional virtual environment. Image 111 is the result of the GPU's application of the texture maps.

In other prior art methods, the central processing unit (CPU) passes the addresses of all textures to the GPU, specifies shader code and geometry for the GPU, and then hands over control to the GPU. The GPU draws the geometry, applying the specified shader for each pixel that covers that geometry. The shader accesses the textures as local variables of the applicable array type (e.g., 1-, 2-, or 3-dimensional arrays) with interpolation support. The shader uses those textures to create the end product, even applying a channel or channels of a texture multiple times. For example, the shader can re-use the R component of the diffuse channel as a reflectivity value. However, texture interpolation is wastefully repeated several times.

Although graphics processors and rendering techniques have improved by leaps and bounds in the past few decades, notably in mass produced, consumer-grade video game hardware, there is an ever-present need in the art for faster and more efficient 3D rendering.

BRIEF SUMMARY

Generally described are systems, devices, and methods for combining different types of textures in one texture set and then using the filtering and interpolation parameters for the texel-to-pixel mappings in order to filter and interpolate the different types of textures. The mappings allow rendering of the proper color at a pixel or other output point with less overhead than the prior art. Interpolation parameters, resulting in a sample from a texel or potentially blended values of multiple texels, are calculated once and then re-used for multiple textures. Textures with data that have completely different meaning and that are used for different purposes, such as color textures and normal maps, are applied using the same interpolation parameters. Interpolation parameters can be re-used between integer-based color texture map and floating point normal maps.

The interpolation parameters can be re-used within the hardware when an interface allows disparate texture maps to be passed as parameters in one call to a GPU. For example, a ten-channel texture set, including diffuse RGB (3), specular RGB (3), normal map XYZ (3), and transparency (1) texture maps, can be passed in one function call to a GPU, and the GPU can process them all at once to render an image.

Methods herein are compatible with deferred rendering, which can use disparate textures to eliminate the overhead of filter parameter determinations and other techniques based on interpolation. In addition to better support for deferred rendering, multi-channel channel textures can allow better support for pre-computed radiance transfer and spectral rendering. Flexible-type buffers that allow the number and data type of textures to be specified by a user (e.g., two integers and three floating point values per pixel) can allow even greater flexibility.

Some embodiments of the present disclosure are directed to a method of graphics processing in a graphics processing unit (GPU). The method includes receiving a first texture having texels of a first primitive data type, receiving a second texture having texels of a second primitive data type, the first and second primitive data types being different from one another, determining, using at least one processor operatively coupled with a memory, an interpolation parameter for a texel of the first data type in the first texture to map to a pixel of an image, the image representing a three-dimensional scene, and applying a texel of the second data type in the second texture to the pixel using the interpolation parameter determined for the first texture.

Some embodiments are directed to a method of graphics processing in a GPU. The method includes receiving a texture set that defines an appearance of a three-dimensional model, the texture set having textures based on primitive data types of which one primitive data type is different than another, determining, using at least one processor operatively coupled with a memory, for a texel position in one of the texture maps an interpolation parameter for a portion on the three-dimensional model, and using the determined interpolation parameter to perform processing on corresponding texels in the other texture maps, thereby using the determined interpolation parameter for textures of different primitive data types.

The method can include receiving a first number from a user indicating a number of integer-based texture maps, receiving a second number from a user indicating a number of floating point-based texture maps, and configuring graphic memory space for the texture set using the first and second numbers received from the user.

Some embodiments are directed to a method of deferred rendering in a GPU. The method includes storing a floating point-based normal vector texture and an integer-based material index into a single target g-buffer for an entire image representing a three-dimensional scene, passing the g-buffer as a texture parameter to a fragment program for the entire image, and determining, using at least one processor operatively coupled with a memory, shading for the image using the g-buffer and the fragment program.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Figure 1:
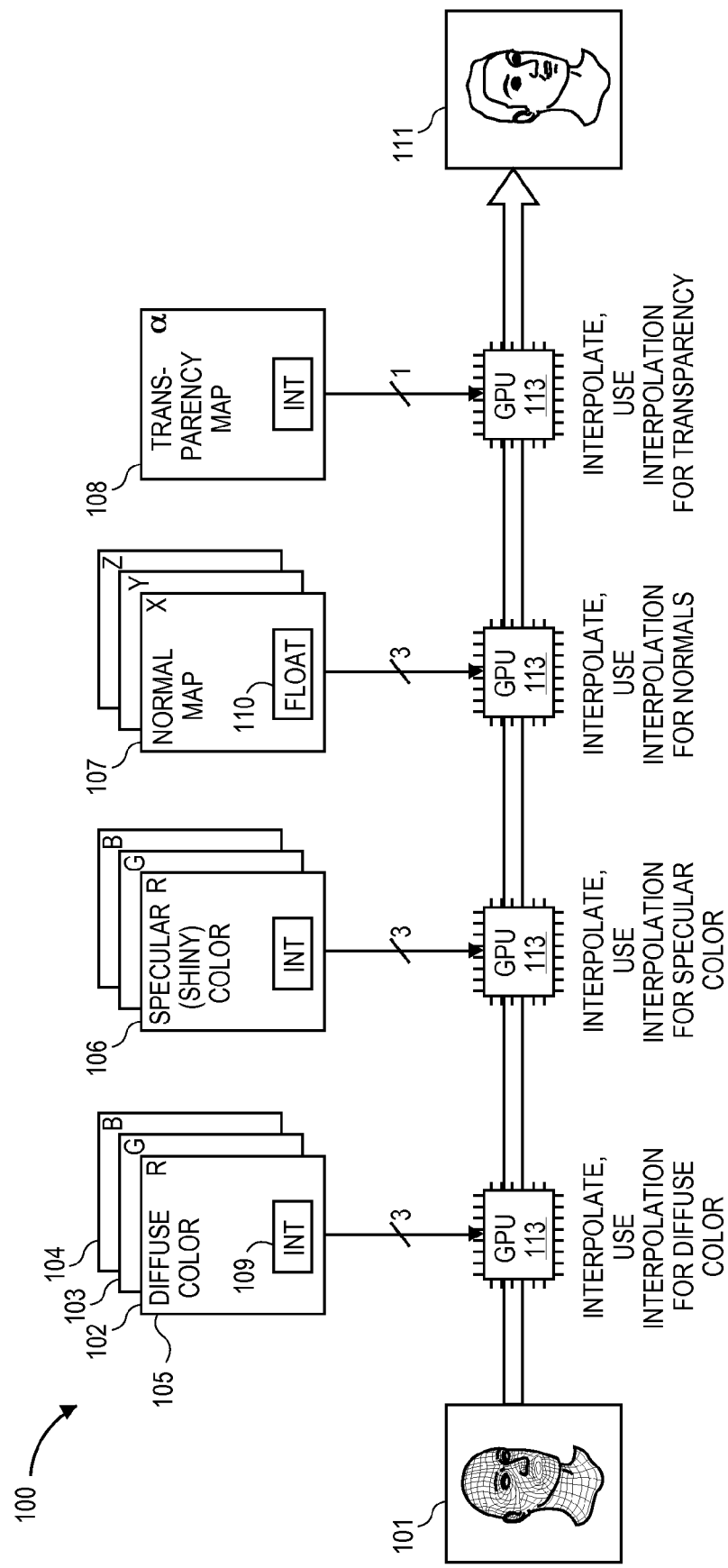
FIG. 1 illustrates a prior art system for applying textures to an image with a graphics processor.

In general, methods, systems, and devices are described for reducing computational overhead when rendering multi-textured 3D geometry. The subject matter described herein can allow support for quality pre-computed radiance transfer, spectral rendering, and improved support for deferred rendering. Disparate-data type texture maps can be passed in a single texture map set to a graphics processing unit or other hardware that can perform graphics rendering. Different primitive data types, including integer and floating point data types, can be used for the texture maps in the texture map set. Interpolation parameters, such as those derived from bilinear and trilinear interpolation, multum in parvo map (mipmap or MIP map) level determination, anisotropic filtering, and other interpolations, are re-used between disparate texture maps. For example, the weighting of a red texel in a diffuse color map can be re-used for an X component of a normal vector in a normal map.

The inventor has recognized that different types of textures, even those with drastically different uses and data, often have the same resolution and mapping. However, prior art GPUs often require a programmer to specify the textures as separate textures, using separate texturing units in hardware. This can be wasteful in many cases because filtering setup and sampling algorithms, such as bi/trilinear interpolation and anisotropic filtering, must then be executed multiple times even though, in the end, the same texture coordinates are used for all textures. One of the reasons for this waste is the arbitrary limitation that prior art GPUs place on textures and frame buffers: they may only have up to four channels (i.e., RGBA, in which 'A' is the alpha channel).

In an embodiment, user-defined texture sets can be set up for passing to a graphics processor. For example, a texture with two int and three float values per pixel can be specified by a programmer, passed to a GPU, and rendered by the GPU in one program call.

Technical advantages of embodiments of the present disclosure include faster rendering and more flexibility in texture mapping for 3D scenes. Texture maps in which space is a concern, such as integer-based RGB texture maps, can have their interpolation parameters re-used with texture maps in which high dynamic range is important, such as in floating point-based normal maps. There can be better support for higher quality pre-computed radiance transfer (e.g., spherical harmonics). Using only four coefficients (i.e., RGBA) per color channel limits the visual detail, especially at shadow/light boundaries. More coefficients would allow for better visual quality. Spectral rendering, where colors are represented by a more densely-sampled spectrum (e.g., 32, rather than just 3) can eliminate the large computational overhead of RGB spectrum conversion at each pixel. Also, an RGB-to-spectrum conversion is underconstrained. That is, an infinite number of metamers will convert to the same RGB triplet. Therefore, if the original data was multi-spectral, converting it to RGB and back to multi-spectral can incur significant information loss. Storing the original, e.g., 32-sample spectral textures, would allow for highly accurate rendering of colors. There can be better support for deferred rendering by extending embodiments to the frame-buffer as well as the textures. These can allow more flexibility regarding the number and type of values stored in the buffer for the lighting pass. Technical advantages extend well beyond rendering 3D scenes. In financial applications, applications that sample data similar to the interpolation methods used for real-time 3D graphics can run faster for programs that accept integer, currency, and floating point data types.

A "primitive data type" includes a byte, integer (e.g., short, regular, long), floating point (including double floating point), Boolean, and char data types. In many programming languages, primitive data types can be combined into composite types, such as with a struct command in C/C++. Primitive data types can be directly supported by hardware or the programming language in use.

A "g-buffer" is a graphics buffer and is used in deferred shading. A g-buffer can include multiple components, which in the prior art are supported by multiple render targets (MRTs). Multiple component g-buffers allow a pixel shader to output several colors at one time.

An "interpolation parameter" of texels includes a weighting, shade, or other parameter taken from one or more texels in order to map the shade or other value from the texel to a pixel or output point. An interpolation parameter can refer to any parameter derived from bilinear interpolation, mipmap selection, trilinear mipmap interpolation, anisotropic filtering, etc. A simple selection of a closest mipmap is sometimes called interpolation and uses an interpolation parameter.

A "texel" includes a pixel or other location in a texture at some addressed coordinates. A texel includes elements in diffuse color textures, specular color textures, normal map textures, transparency map textures, reflection map textures, pre-computed light textures, material index textures, etc.

A "color" can include colors represented by traditional screen component colors red, green, and blue (RGB), traditional lithography colors represented by cyan, magenta, yellow, and black (CMYK), nontraditional multi-spectral colors (e.g., hyperspectral, 32 channels of colors), gray-scales, and other representations of electromagnetic radiation characteristics.

Figure 2:
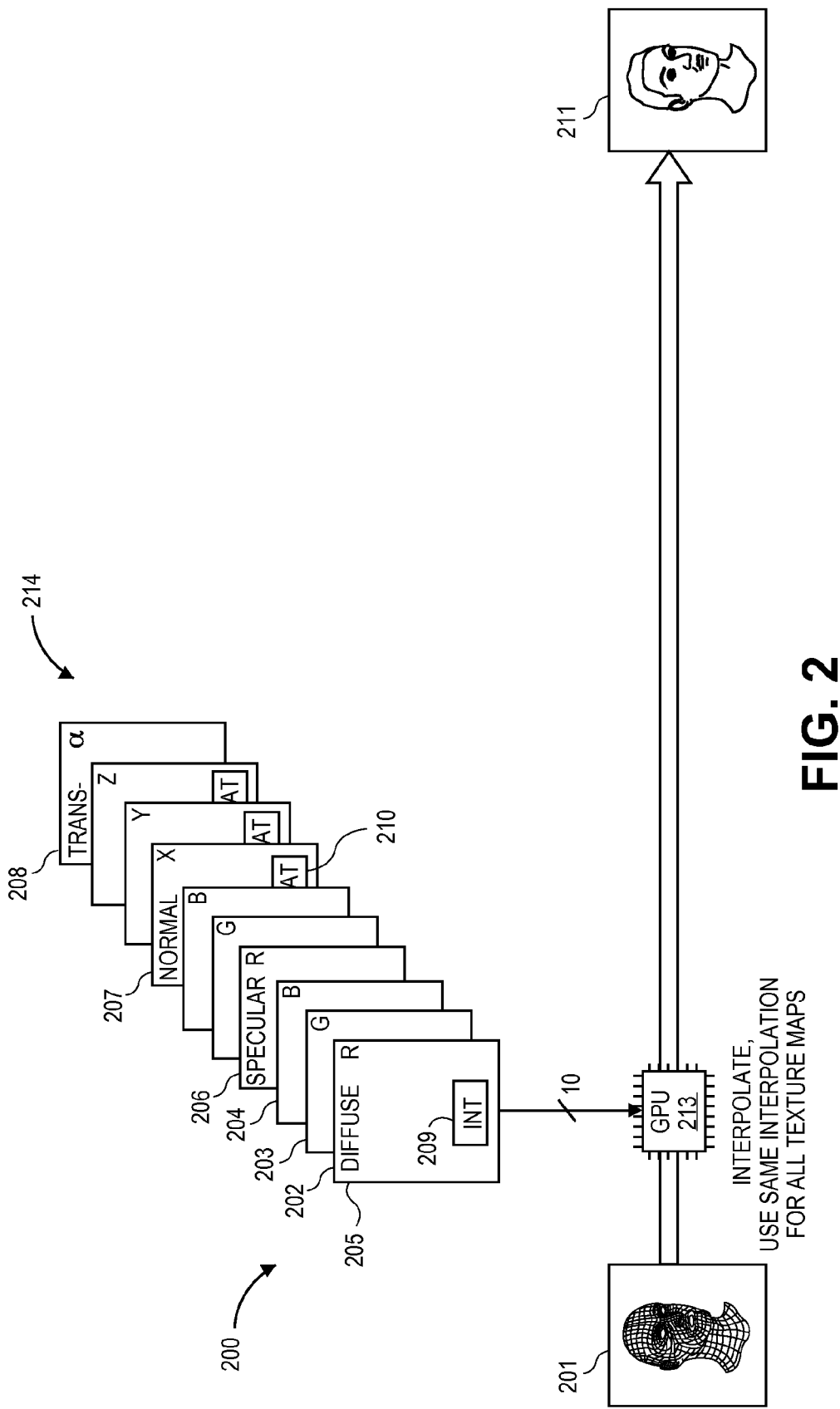
FIG. 2 illustrates a system for applying textures to an image with a graphics processor in accordance with an embodiment.

FIG. 2 illustrates a system for applying textures to an image with a graphics processor in accordance with an embodiment. In system 200, three-dimensional model 201 is stored in a memory for processing by GPU 213. Ten-channel texture map set 214 includes diffuse color texture map 205, specular color texture map 206, normal map 207, and transparency map 208. Diffuse color texture map includes R, G, and B maps 202, 203, and 204, respectively. Specular color texture map 206 includes RBG maps as well. Texture maps 205, 206, and 208 are integer-based with texels of each texture storing data as integer data type 209. Normal map 207 is floating point-based, with texels of each texture array X, Y, and Z stored as floating point data type 210. Normal maps sometimes require high dynamic range because small angles make a large difference in terms of light reflections. Light maps or transparency maps are more likely to need high dynamic range in order to avoid banding artifacts.

Ten-channel texture map set 214 is passed as a parameter to GPU 213. GPU 213 determines an interpolation parameter for a texel in R texture map 202 and re-uses that interpolation parameter not only for G and B texture maps 203 and 204, but also for the component maps of specular color texture map 206 (RGB), normal map 207 (XYZ), and transparency map 208 (α).

For example, for a pixel at a certain position in an image, a position for the pixel is determined on 3D model 201 and thus on the texture map. The weighting for the corresponding texel on the texture map, along with surrounding texels, is derived from the position's relative centeredness on the texel. The weighting for one R texel to map to the pixel is re-used as the weighting for the X component on the normal map. The weighting for one G texel to map to the pixel is re-used as the weighting for the Y component on the normal map. The weighting for one B texel to map to the pixel is re-used as the weighting for the Z component on the normal map.

After ten-channel texture map set 214 is applied to 3D model 201, image 211 representing a three-dimensional scene is available. A ten-channel texture map is thought to incorporate many of the standard textures used for real-time 3D rendering in video games. However, different numbers of channels are suitable.

In some embodiments, a user can specify the number of textures to be input to the GPU. For example, a user can type in, enter, select, or otherwise indicate a number that represents a number of integer-based texture maps to be passed as a parameter to a GPU function. The user can indicate another number that represents a number of floating point-base texture maps to be passed as a parameter to a GPU function. The GPU can then configure graphic memory space for the texture map set using the numbers supplied by the user. When a user calls a rendering function, interpolation parameters are used for all of the textures, whether integer- or floating point-based, in order to sample or otherwise adjust pixels using the texels of the texture maps. By calling the rendering function with all the textures as parameters, it can be easier to re-use calculated interpolation parameters between textures.

Figure 3:
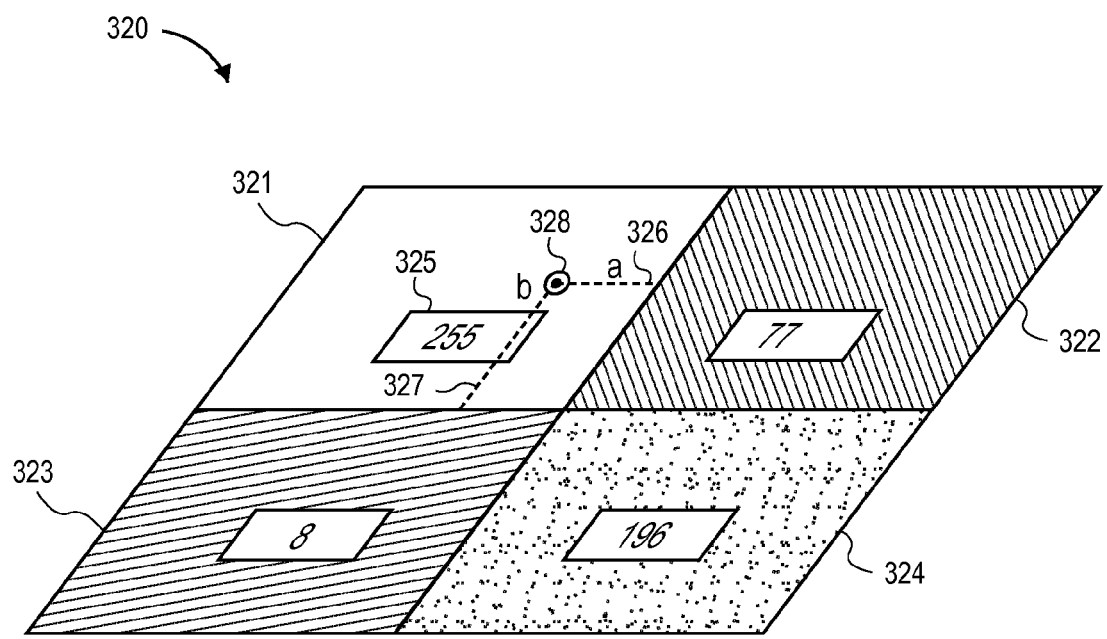
FIG. 3 illustrates a quad with texels of an integer data type in accordance with an embodiment.

FIG. 3 illustrates a quad with texels of an integer data type in accordance with an embodiment. Quad 320, a set of four texels from an RGB color texture map, includes texels 321, 322, 323, and 324. Each of the texels represents a different degree of a component color. For example, each of the texels represents a value of red in an RGB representation of color. Each texel includes an integer, such as integer 325.

A center of a pixel in an image maps to position 328 in the quad. If the pixel were mapped to the exact center of the quad, the colors from each texel 321, 322, 323, and 324 would be weighted equally (i.e., 25% each) to result in a blended color. In the exemplary embodiment, texel 321, on which the pixel falls, is weighted more heavily than the other texels of the quad. Based on horizontal distance 326 'a' and vertical distance 327 'b' from the center of the quad, texel 321 is weighted for the pixel. The horizontal and vertical distances 326 and 327 are interpolation parameters, derived from a bilinear interpolation, upon which the weightings are based. In addition, a distance (i.e., sqrt($a^2+b^2$)) or other combination of horizontal and vertical distances 326 and 327 can be considered interpolation parameters.

Figure 4:
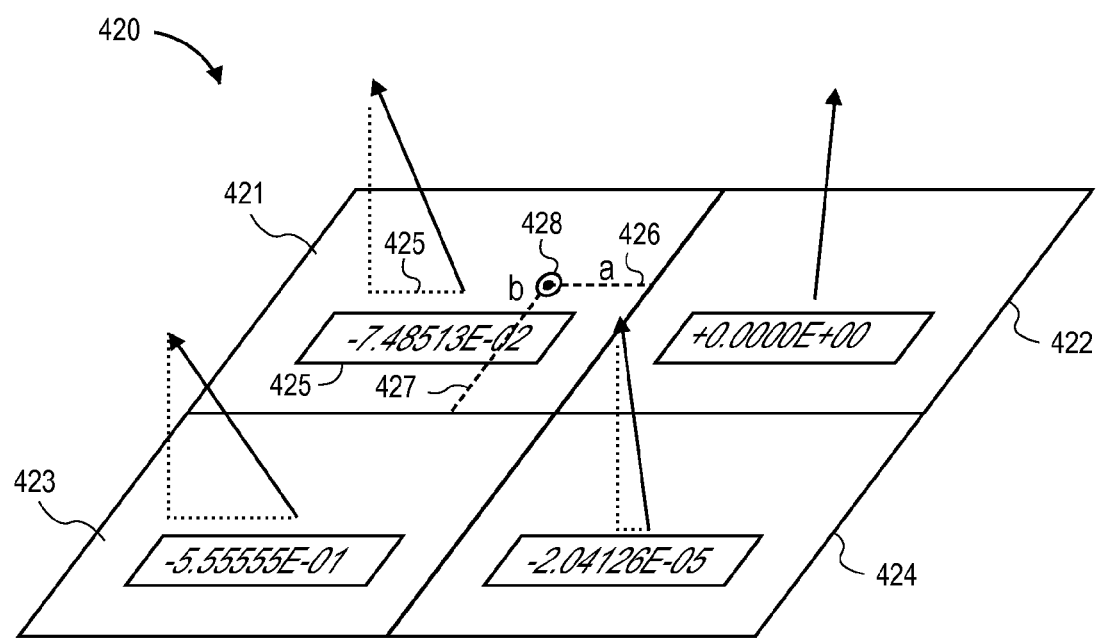
FIG. 4 illustrates a quad with texels of a floating point data type in accordance with an embodiment.

FIG. 4 illustrates a quad with texels of a floating point data type in accordance with an embodiment. Quad 420, a set of four texels from a normal map, includes texels 421, 422, 423, and 424. Each of the texels represents a direction component of a unit vector. For example, each of the texels represents an X component in an XYZ representation of a unit vector. Each texel is represented by a floating point number, such as floating point number 425.

A center of a pixel in an image maps to position 428 in the quad. If the pixel were mapped to the exact center of the quad, the X components from each texel 421, 422, 423, and 424 would be weighted equally (i.e., 25% each) to result in an averaged X component. In the exemplary embodiment, texel 421, on which the pixel falls, is weighted more heavily than the other texels of the quad. Based on horizontal distance 426 'a' and vertical distance 427 'b' from the center of the quad, texel 421 is weighted for the pixel. The horizontal and vertical distances 426 and 427 are interpolation parameters upon which the weightings are based.

The inventor has recognized that many of the interpolation parameters derived for RGB textures can be re-used for XYZ textures. Furthermore, the interpolation parameters can be re-used between integer- and floating point-based quads. This can save processor cycles in hardware.

Determining horizontal and vertical distances 326/327 (FIG. 3) and 426/427 (FIG. 4) can result in significant overhead in a GPU. One can re-use the derived distances or weightings from the integer-based texture of FIG. 3 for the floating point-based texture of FIG. 4 so that the processor wastes less time re-calculating the distances or weighting and/or looking them up from a memory cache.

Figure 5:
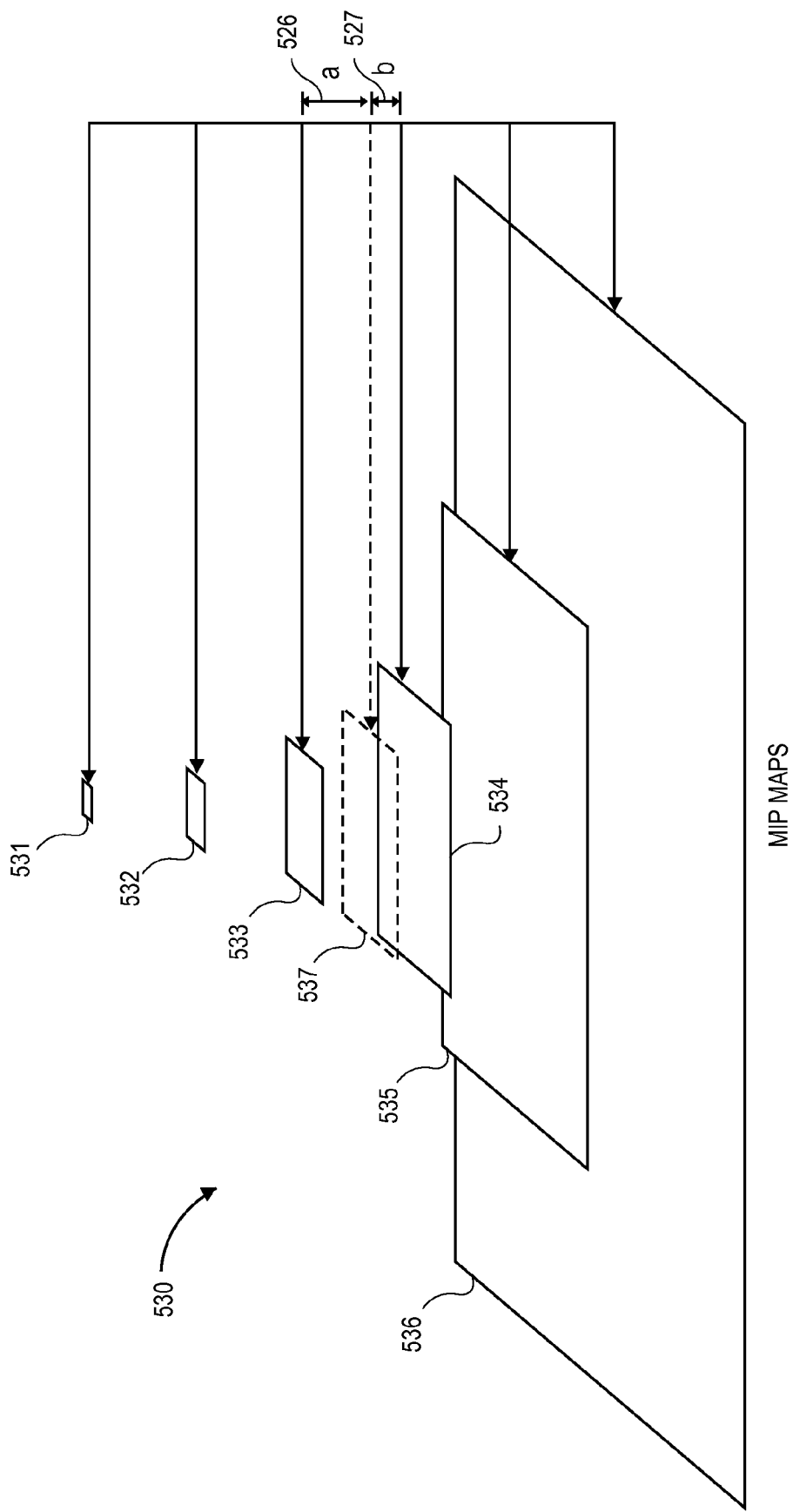
FIG. 5 illustrates mipmaps in accordance with an embodiment.

FIG. 5 illustrates mipmaps in accordance with an embodiment. Mipmap pyramid 500 includes 1×1 mipmap 531, 2×2 mipmap 532, 4×4 mipmap 533, 8×8 mipmap 534, 16×16 mipmap 535, and 32×32 mipmap 535. Mipmap 500 can be part of a larger pyramids of mipmaps.

In determining one or more mipmaps for use, a scale is determined for an object in a 3D scene. In the exemplary embodiment, the scale for the object of interest is at level 537. Level 537 falls between mipmap 533 and mipmap 534. The relative distance to smaller mipmap 533 is distance 526 'a', and the relative distance to larger mipmap 534 is distance 527 'b'. A trilinear interpolation of mipmaps 533 and 534 uses interpolation parameters 526 and 527. An interpolated value is picked from both mipmaps. These two values are then interpolated, using the third interpolation (hence the name "trilinear") parameter based on the relative distance (i.e., distance 526 'a' and distance 527 'b') to each MIP level.

In other embodiments, a simple selection of the closest-in-scale mipmap is used. For example, if 'distance' b<a, then mipmap 534 is used for further processing. That is, if mipmap 537 is closer in scale to mipmap 534 than mipmap 533, then mipmap 534 is used for further processing. In some embodiments, a simple selection of a mipmap uses the selection itself, which is considered an interpolation parameter.

Determining the mipmap(s) of the proper scale can consume significant resources. Re-using interpolation parameters 526 and 527 for other mipmaps, including those based on integers or floating point numbers, can reduce the need for such resources. This may be extremely useful in situations in which anisotropic filtering is used for asymmetric mipmaps.

Figure 6:
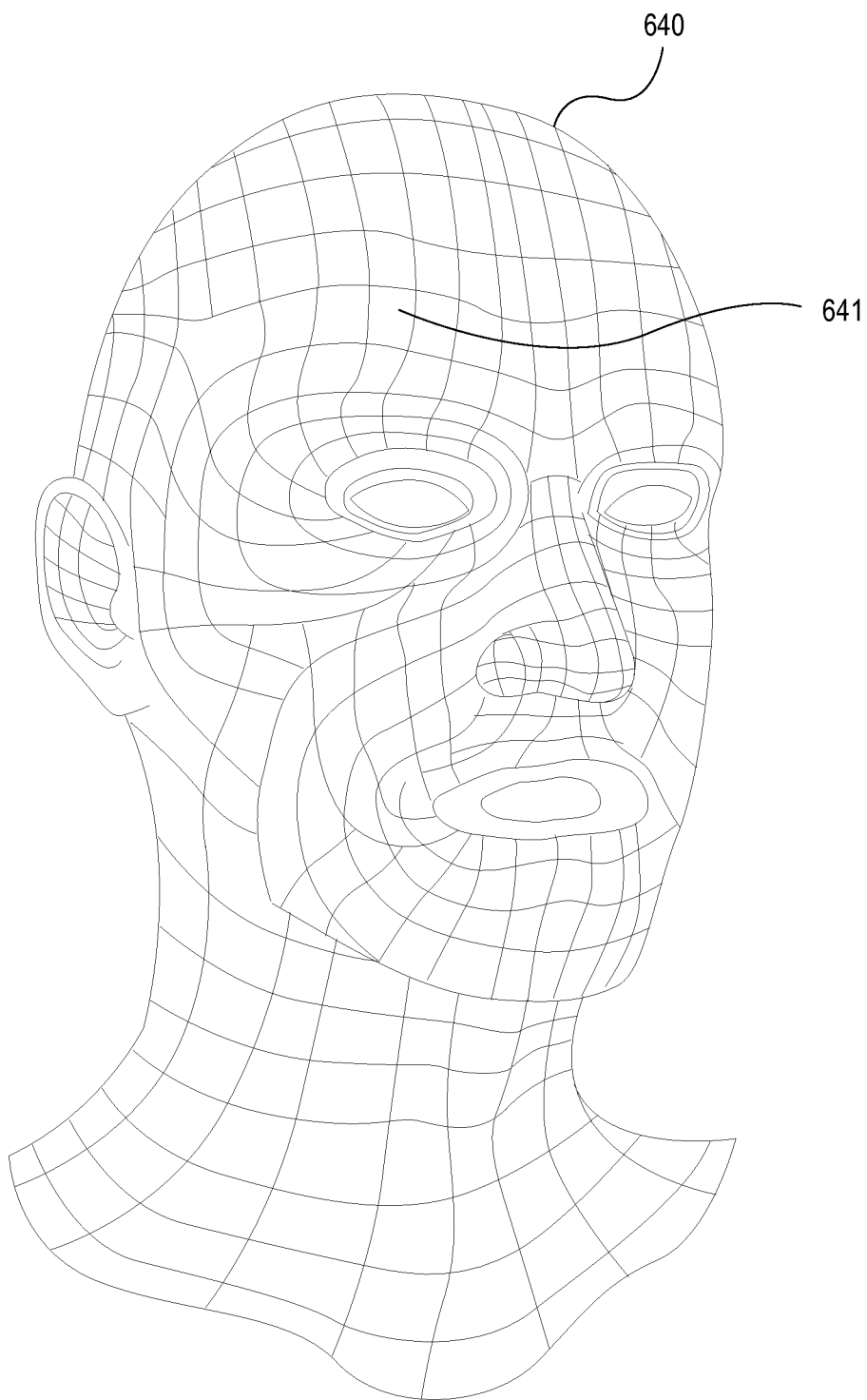
FIG. 6 illustrates a three-dimensional model in accordance with an embodiment.

FIG. 6 illustrates a three-dimensional model in accordance with an embodiment. 3D model 640, a human head, is rendered with a wireframe for illustration. Pixel 641 on 3D model 640 can have several textures mapped to it. The textures, including diffuse and specular color textures, normal maps, and transparency maps, can be used to render the model in a three-dimensional scene.

Figure 7:
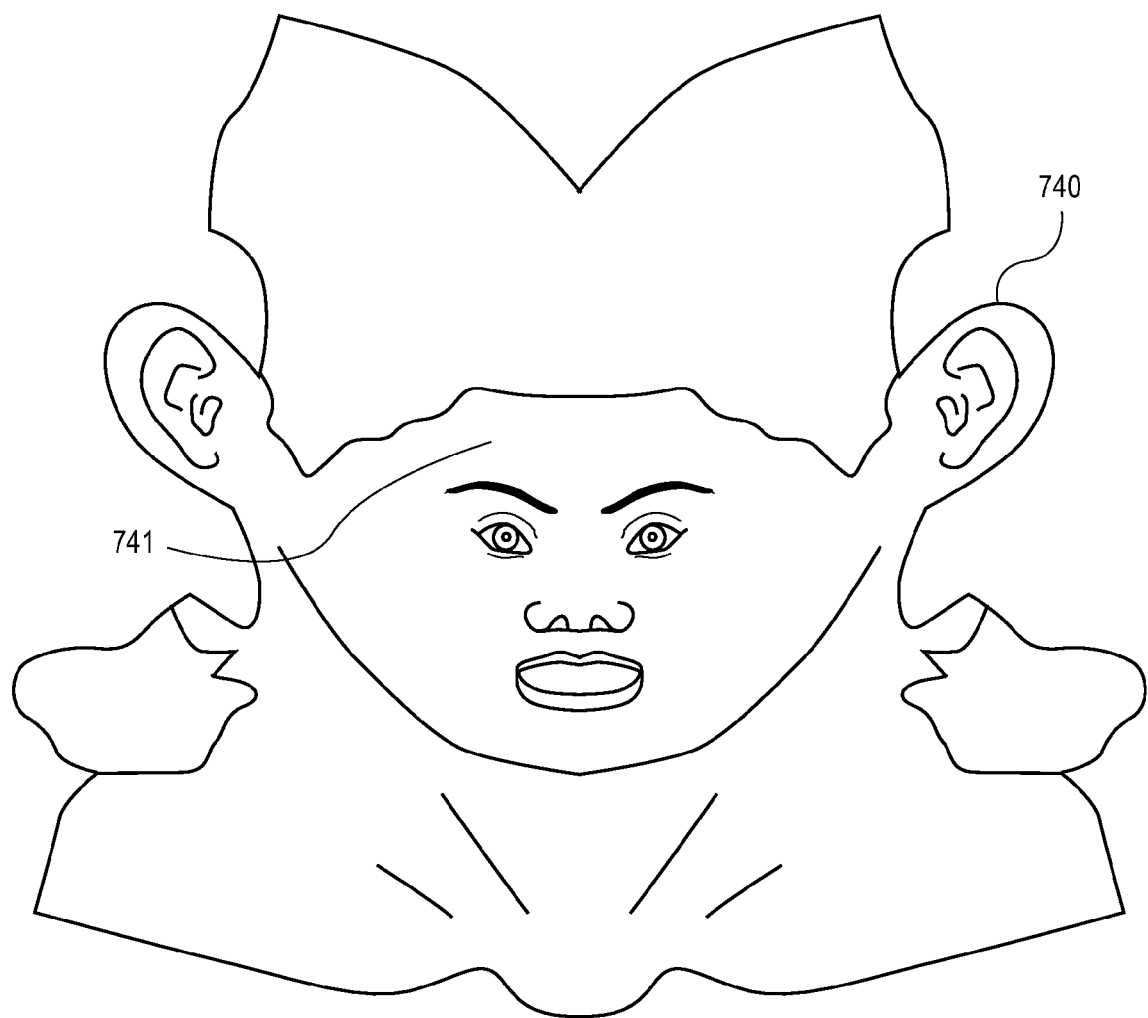
FIG. 7 illustrates a texture map in accordance with an embodiment.

FIG. 7 illustrates a texture map in accordance with an embodiment. Texture map 740, a diffuse color texture map, includes features such as eyes, ears, a mouth, etc. Texel 741 maps to pixel 641 on FIG. 6. By mapping texture map 740 along with other texture maps to 3D model 640 (FIG. 6), a realistic 3D image can be produced.

Figure 8:
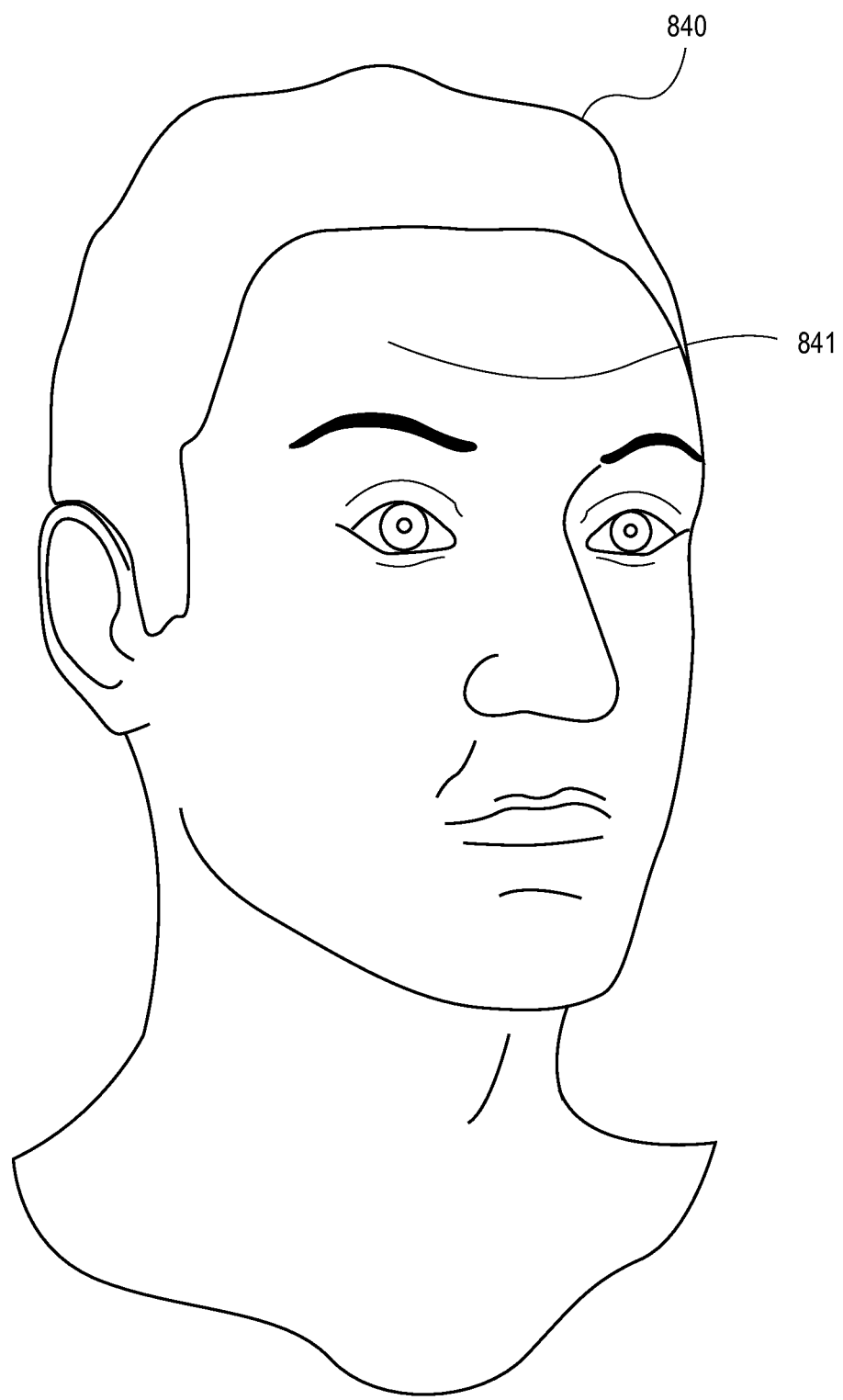
FIG. 8 illustrates the texture map of FIG. 7 applied to the three-dimensional model of FIG. 6 in accordance with an embodiment.

FIG. 8 illustrates the texture map of FIG. 7 applied to the three-dimensional model of FIG. 6 in accordance with an embodiment. 3D head 840 has pixel 841, which corresponds to pixel 641 (FIG. 6) and texel 741 (FIG. 7). The three-dimensional object of FIG. can be used in video games, CAD drawings, and other 3D environments.

The rendering of FIG. 8 can also be accomplished using deferred rendering. A floating point-based normal map and an integer-based material index can be stored into a single target g-buffer. The single g-buffer can be passed as a texture parameter to a user-supplied fragment program for an entire, full-screen image. Shading for the image is computed for the image using the g-buffer and fragment program.

Figure 9:
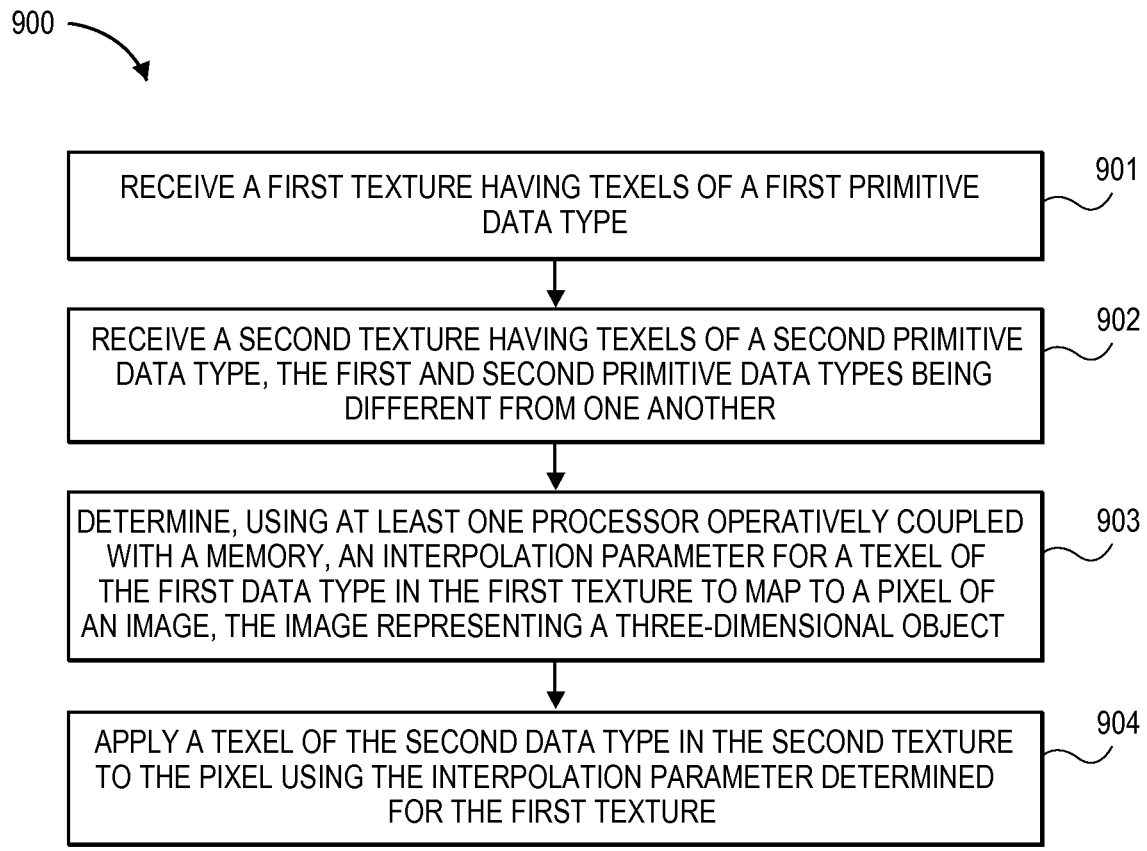
FIG. 9 is a flowchart of a process in accordance with an embodiment.

FIG. 9 is a flowchart illustrating process 900 in accordance with an embodiment. In operation 901, a first texture having texels of a first primitive data type are received. In operation 902, a second texture having texels of a second primitive data type are received. The first and second primitive data types are different from one another. In operation 903, it is determined, using at least one processor operatively coupled with a memory, an interpolation parameter for a texel of the first data type in the first texture to map to a pixel of an image, the image representing a three-dimensional object or scene. In operation 904, a texel of the second data type in the second texture is applied to the pixel using the interpolation parameter determined for the first texture.

Figure 10:
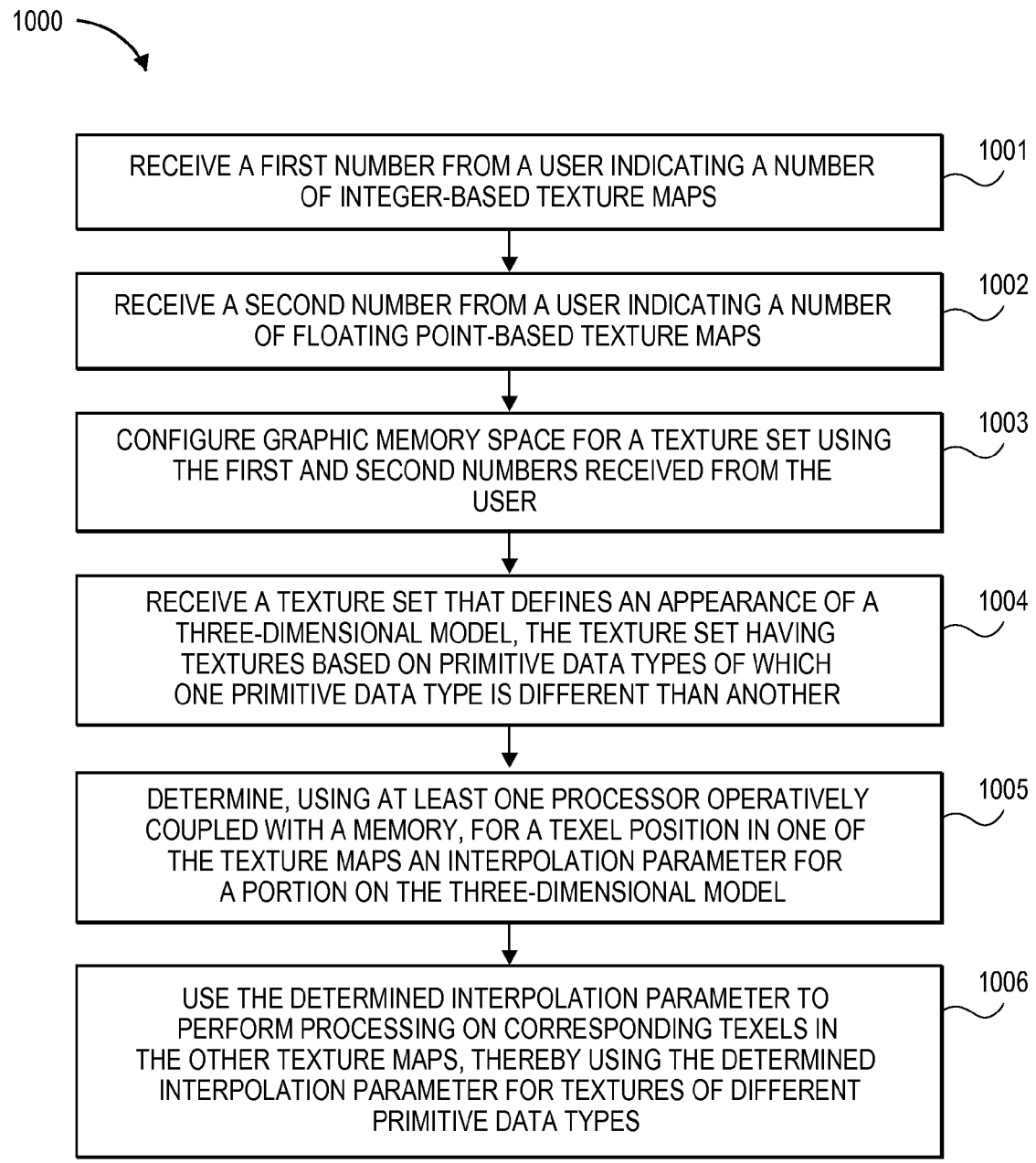
FIG. 10 is a flowchart of a process in accordance with an embodiment.

FIG. 10 is a flowchart illustrating process 1000 in accordance with an embodiment. In operation 1001, a first number is received from a user indicating a number of integer-based texture maps. In operation 1002, a second number is received from a user, possibly the same user, indicating a number of floating point-based texture maps. In operation 1003, graphic memory space is configured for a texture set using the first and second numbers received from the user. In operation 1004, a texture set that defines an appearance of a three-dimensional model is received, the texture set having textures based on primitive data types of which one primitive data type is different than another. In operation 1005, it is determined, using at least one processor operatively coupled with a memory, for a texel position in one of the texture maps an interpolation parameter for a portion on the three-dimensional model. In operation 1006, the determined interpolation parameter is used to perform processing on corresponding texels in the other texture maps. This allows using the determined interpolation parameter for textures of different primitive data types.

Figure 11:
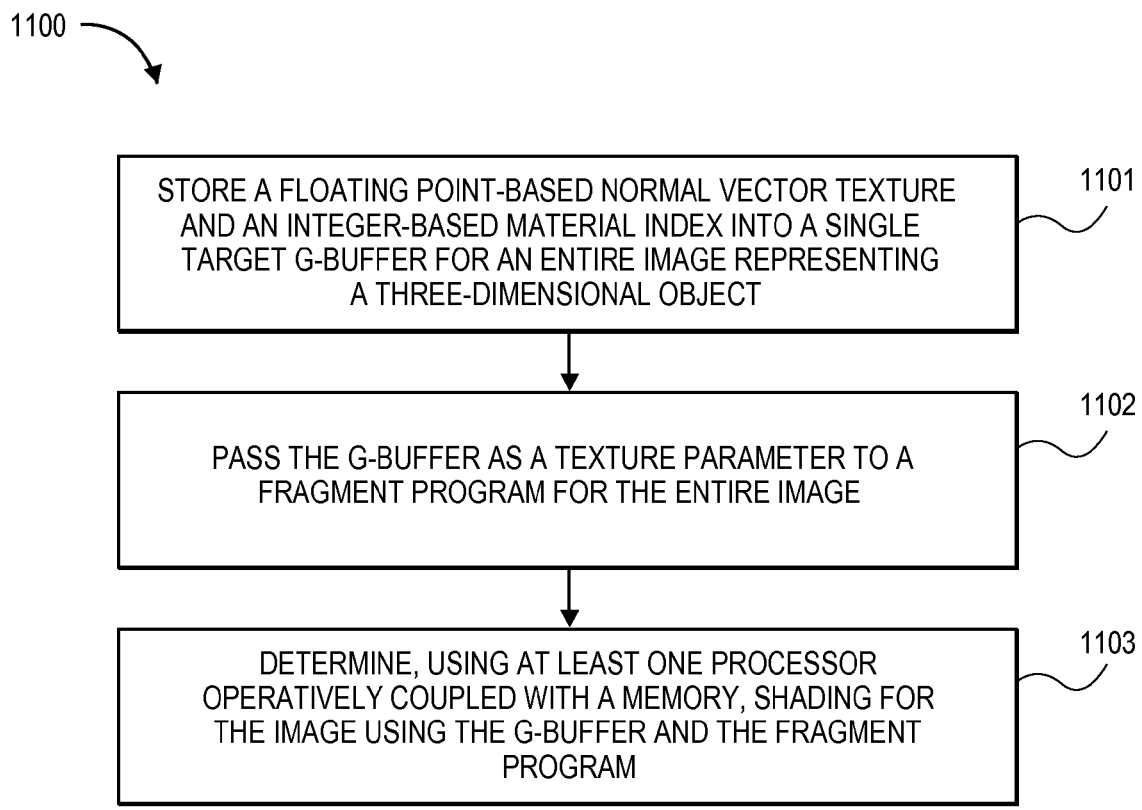
FIG. 11 is a flowchart of a process in accordance with an embodiment.

FIG. 11 is a flowchart illustrating process 1100 in accordance with an embodiment. In operation 1101, a floating point-based normal vector texture and an integer-based material index are stored into a single g-buffer for an image representing a three-dimensional object or scene. In operation 1102, the g-buffer is passed as a texture parameter to a fragment program for the entire image. In operation 1103, it is determined, using at least one processor operatively coupled with a memory, shading for the image using the g-buffer and the fragment program.

The operations may be performed in the sequence given above or in different orders as applicable. They can be automated in a computer or other machine and can be coded in software, firmware, or hard coded as machine-readable instructions and run through one or more processors that can implement the instructions.

Figure 12:
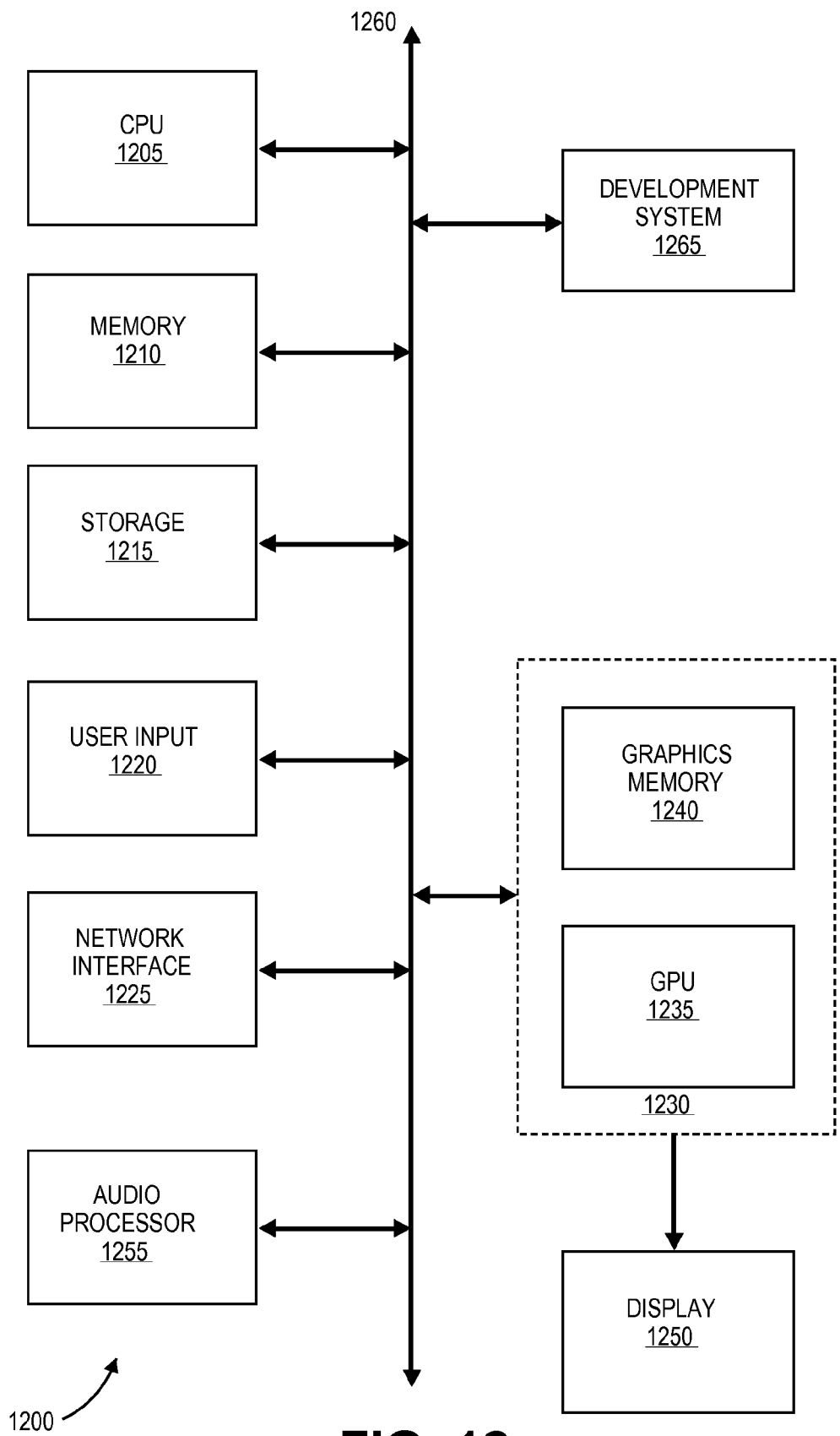
FIG. 12 illustrates a computer system suitable for implementing an embodiment.

FIG. 12 illustrates an example of a hardware system suitable for implementing a device in accordance with various embodiments. This block diagram illustrates a computer system 1200, such as a personal computer, video game console and associated display, mobile device, personal digital assistant, or other digital device, suitable for practicing embodiments of the invention. Computer system 1200 includes a central processing unit (CPU) 1205 for running software applications and optionally an operating system. CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows computer system 1200 to communicate with other computer systems via an electronic communications network, and may include wired or wireless communication over local area networks and wide area networks such as the Internet. An audio processor 1230 is adapted to generate analog or digital audio output from instructions and/or data provided by the CPU 1205, memory 1210, and/or storage 1215. The components of computer system 1200, including CPU 1205, memory 1210, data storage 1215, user input devices 1220, network interface 1225, and audio processor 1230 are connected via one or more data buses 1235.

A graphics subsystem 1240 is further connected with data bus 1235 and the components of the computer system 1200. The graphics subsystem 1240 includes a graphics processing unit (GPU) 1245 and graphics memory 1250. Graphics memory 1250 includes a display memory (e.g., a frame buffer) used for storing pixel data for each pixel of an output image. Graphics memory 1250 can be integrated in the same device as GPU 1245, connected as a separate device with GPU 1245, and/or implemented within memory 1210. Pixel data can be provided to graphics memory 1250 directly from the CPU 1205. Alternatively, CPU 1205 provides the GPU 1245 with data and/or instructions defining the desired output images, from which the GPU 1245 generates the pixel data of one or more output images. The data and/or instructions defining the desired output images can be stored in memory 1210 and/or graphics memory 1250. In an embodiment, the GPU 1245 includes 3D rendering capabilities for generating pixel data for output images from instructions and data defining the geometry, lighting, shading, texturing, motion, and/or camera parameters for a scene. The GPU 1245 can further include one or more programmable execution units capable of executing shader programs.

The graphics subsystem 1240 periodically outputs pixel data for an image from graphics memory 1250 to be displayed on display device 1255. Display device 1255 can be any device capable of displaying visual information in response to a signal from the computer system 1200, including CRT, LCD, plasma, and OLED displays. Computer system 1200 can provide the display device 1255 with an analog or digital signal.

In accordance with various embodiments, CPU 1205 is one or more general-purpose microprocessors having one or more processing cores. Further embodiments can be implemented using one or more CPUs 1205 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of graphics processing in a graphics processing unit (GPU), the method comprising:
   receiving a first texture map having texels of a first primitive data type;
   receiving a second texture map having texels of a second primitive data type, the first and second primitive data types being different from one another, the first and second texture maps comprising a set of texture maps that define an appearance of a three-dimensional object, the first and second texture maps having a same size;
   determining, using a first texturing unit of the GPU, an interpolation parameter for a texel of the first primitive data type in the first texture map to map to a pixel of an image, the image representing the three-dimensional object, the interpolation parameter comprising a weight to be applied to the texel of the second primitive data type; and
   re-using the interpolation parameter determined for the first texture map adapted for the second primitive data type in the second texture map by using a second texturing unit of the GPU to apply a texel of the second primitive data type in the second texture map.

2. The method of claim 1 wherein one of the primitive data types is an integer data type and the other primitive data type is a floating point data type.

3. The method of claim 2 wherein the texture map having texels of an integer data type is selected from the group consisting of:
   a diffuse color texture map;
   a specular color texture map;
   a transparency map; and
   a material index.

4. The method of claim 2 wherein the texture map having texels of a floating point data type is selected from the group consisting of:
   a normal vector map;
   a reflection map;
   a pre-computed light map; and
   a grayscale texture,
   the floating point data type allowing for high dynamic range maps.

5. The method of claim 1 wherein the interpolation parameter is a weighting derived from a bi-linear interpolation.

6. The method of claim 1 wherein the interpolation parameter is derived from multum in parvo map (mipmap) selection.

7. The method of claim 6 wherein the mipmap selection uses a closest-in-scale mipmap.

8. The method of claim 1 wherein the interpolation parameter is a weighting derived from multum in parvo map (mipmap) trilinear interpolation.

9. The method of claim 1 wherein the interpolation parameter is a weighting derived from anisotropic filtering.

10. The method of claim 9 wherein anisotropic filtering is used for asymmetric mipmaps.

11. The method of claim 1 wherein one of the data types is a floating point-based normal vector texture map and the other data type is an integer-based material index.

12. The method of claim 1 wherein the interpolation parameter comprises a combination of horizontal and vertical distances from a center of the texel of the first data type.

13. The method of claim 1 wherein values for the texels of the first texture map are weighted equally.

14. A machine-readable tangible storage medium embodying information indicative of instructions for causing one or more machines to perform operations, the operations comprising:
   receiving a first texture map having texels of a first primitive data type;
   receiving a second texture map having texels of a second primitive data type, the first and second primitive data types being different from one another, the first and second texture maps comprising a set of texture maps that define an appearance of a three-dimensional object, the first and second texture maps having a same size;
   determining, using a first texturing unit of a graphics processing unit, an interpolation parameter for a texel of the first primitive data type in the first texture map to map to a pixel of an image, the image representing the three-dimensional object, the interpolation parameter comprising a weight to be applied to the texel of the second primitive data type; and
   re-using the interpolation parameter determined for the first texture map adapted for the second primitive data type in the second texture map by using a second texturing unit of the graphics processing unit to apply a texel of the second primitive data type in the second texture map.

15. A method of graphics processing in a graphics processing unit (GPU), the method comprising:

receiving a texture map set that defines an appearance of a three-dimensional model, the texture map set having texture maps based on primitive data types of which one primitive data type is different than another, the texture maps having a same size;

determining, using a first texturing unit of the GPU, for a texel position in one of the texture maps an interpolation parameter for a portion on the three-dimensional model, the interpolation parameter comprising a weight to be applied to a corresponding texel of a second primitive data type; and re-using the interpolation parameter determined for the portion on the three-dimensional model adapted for processing on corresponding texels in other texture maps from the texture map set, thereby using a second texturing unit of the GPU to apply the determined interpolation parameter for texture maps of different primitive data types.

16. The method of claim 15 further comprising:

receiving a first number from a user indicating a number of integer-based texture maps;

receiving a second number from a user indicating a number of floating point-based texture maps; and configuring graphic memory space for the texture map set using the first and second numbers received from the user.

17. The method of claim 15 wherein the interpolation parameter is derived from bilinear interpolation, multum in parvo map (mipmap) selection, mipmap trilinear interpolation, or anisotropic filtering.

18. The method of claim 15 wherein the texture map set comprises:

a three-channel integer-based diffuse color texture map;
a three-channel integer-based specular color texture map;
a three-channel floating point-based normal map; and
a one-channel integer-based transparency map.

19. The method of claim 15 wherein the primitive data types include floating point and integer data types.

20. The method of claim 15 wherein the three-dimensional model is used in a CAD drawing.

\* \* \* \* \*